Figure 1:
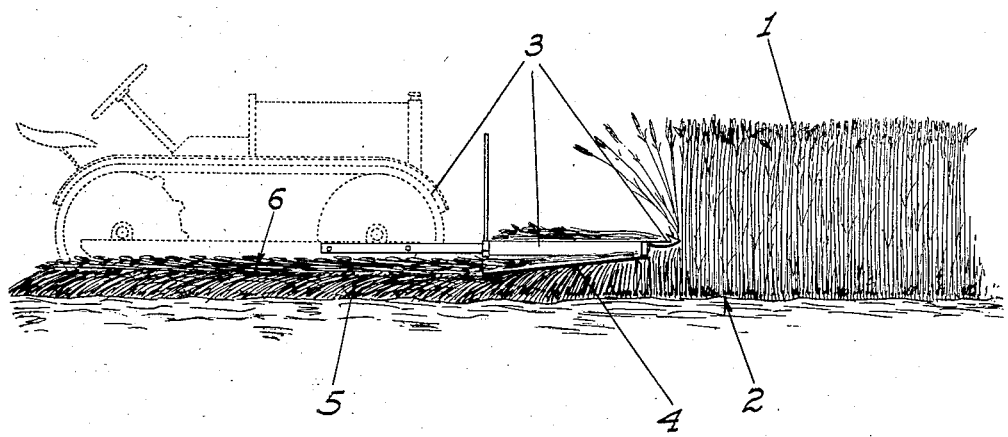

Dec. 5, 1933.   W. M. TEMPLETON   1,938,264
METHOD OF HARVESTING RICE AND LIKE GRAINS
Filed Jan. 14, 1927

INVENTOR.
Wm. M. Templeton
BY
ATTORNEY

Patented Dec. 5, 1933

1,938,264

UNITED STATES PATENT OFFICE 1,938,264

METHOD OF HARVESTING RICE AND LIKE GRAINS

William M. Templeton, Willows, Calif.

Application January 14, 1927. Serial No. 161,106

7 Claims. (Cl. 56—1)

This invention relates to improvements in the art or method of harvesting rice and grains of a like character which grow in wet and swampy places, and which are harvested in a semi-green condition.

As is well known, rice is grown in standing water and the water is withdrawn from it late in the season, leaving the base of the field wet and muddy and the grain itself is cut in the semi-green condition. Heretofore it has been the custom to cut the grain with binders so as to allow it to cure before being harvested. When this is done the shocks of the bound grain rest on the muddy ground and are very slow in drying out and if a rain happens to come before the same are threshed it very often happens that the shocks become so wet that they will not dry out at all and the crop becomes a total loss. Also it has been a very hard matter to get onto the field with the binders or harvesters due to the wet condition of the ground, and this has likewise delayed the harvesting and threshing operation to such an extent that many times wet weather sets in and ruins the crop before it can be completely harvested and hauled from the field.

It is therefore the object of my invention to provide a method for cutting the grain and depositing it in a smooth and well ventilated condition without binding it and without having it lay upon the wet ground, so that it will be aerated and cured very quickly, and should it chance to be rained on it will likewise dry out very quickly, so that the harvesting operation may be carried on more rapidly and effectively than under present methods.

To this end my improved method consists in cutting the grain and at the same time bending over and flattening out the uncut stubble beneath the cut portion of the grain and then depositing the cut grain upon this mat or support of bent-over and flattened-out straw.

Figure 2:
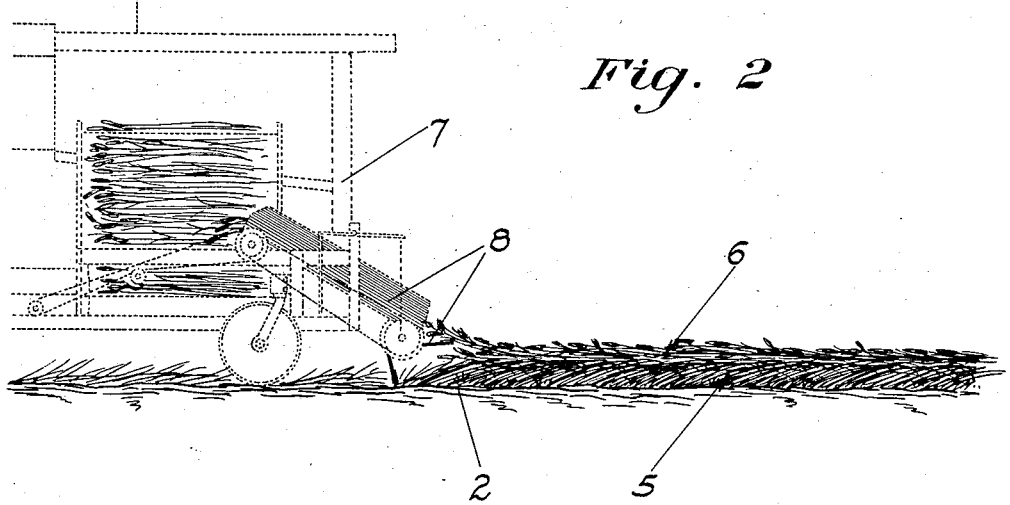

In the drawing:

Fig. 1 is a side elevation of the apparatus used to carry out this method of harvesting, and Fig. 2 is a similar view of device which may be used to pick up and thresh the grain.

Just how this operation is carried out is set forth in Fig. 1 of the drawing wherein the numeral 1 designates the standing grain, 2 the ground line, and 3 the cutting apparatus which may be of any desired type, underneath which is a flattening board 4 of a type preferably of that form shown in my co-pending application for patent, Serial No. 95,616, filed March 18th, 1926, in which construction it will be seen that the plate is so located relative to the cutter bar and so inclined that it will apply a bending force to the upper parts only of the stubble so as to form an elevated mat or bed. This flattening board moves over the stubble 5 and flattens it down into the mat-like shape shown in the figures in the drawing, and the cut grain is strewn along on top of this mat as at 6. The inner position of the plate between the discharge end of the draper and the stubble also tends to relieve the transversely moving grain from its momentum and cause the grain to be laid upon the deflected stubble in a quiescent state. From this it will readily be seen that as the grain is cut it is deposited upon a well aerated support which holds it away from the wet ground and allows the free circulation of air and sunshine through the same, whereby it can be readily and quickly gathered without touching the damp ground. Also should it be rained upon the fact that it is supported in such a manner as to allow free circulation of air will quickly cause it to dry out again.

After the grain has been cut and deposited on this supporting mat of the pressed down straw and has remained there a sufficient time to be thoroughly cured, any suitable pick-up thresher 7 may be brought into the field and the cut grain picked up off of the straw mat by the pick-up element 8 of any desired type, and delivered into the threshing machine, all as shown in Fig. 2 of the drawing.

It will be apparent from this description that by my improved method the grain can be handled much more easily and cheaply than by the present method of binding and then threshing, and also the chances of loss due to the grain not properly curing or becoming wet and moldy before threshing is practically eliminated.

While I have shown brief outlines of certain types of apparatus which may be used in the carrying out of my improved method, still in practice any mechanism found desirable either for the cutting of the grain, matting the straw and depositing the grain on the mat may be used, and likewise any form of pick-up and threshing mechanism may likewise be used whenever same may be found adaptable.

Having thus described my improved method what I claim as new and useful and desire to secure by Letters Patent is:

1. The method of harvesting crops consisting in cutting the crop, pressing down the tops of the stubble to a substantially uniform height across a path of a width predetermined to the width of the windrow to be laid to form an elevated springy stubble mat capable of holding a windrow in aerating position above the ground, and then depositing the cut crop on such stubble.

2. The method of harvesting crops consisting in cutting the crop, pressing down the stubble tops to a substantially uniform height across a path of predetermined windrow width less than the width of cut to form an elevated aerating supporting mat, and then depositing the cut crop on such stubble mat.

3. The method of harvesting crops consisting in cutting the crop along a line to leave stubble, pressing down the tops of the stubble to a substantially uniform height across a path of a width predetermined to the width of the windrow to be laid to form an elevated springy stubble mat capable of holding a windrow in aerating position above the ground, carrying the cut crop parallel to the line of cut to a delivery zone, arresting the movement of the material at the end of said carrying movement, and then moving the material transversely of said carrying movement and laying it in a substantially quiescent state on top of said stubble in windrow formation.

4. The method of harvesting a standing crop which consists of cutting the crop to leave stubble, then carrying the cut crop material parallel to the line of cut to a delivery zone, depositing the material at the end of said carrying movement upon a support lying immediately above the stubble to relieve the momentum of the material, bending the tops of the stubble, and then continuously moving the material from its support transversely of said carrying movement and laying it in a substantially quiescent state upon the bent tops of said stubble.

5. The method of harvesting a crop which consists in cutting the standing crop to leave field stubble, applying a bending force to the tops only of the stubble to form an elevated springy stubble mat capable of holding a windrow in aeratable position above the ground, moving the cut crop to a zone of discharge to form a windrow, checking said movement to relieve the momentum of the material, and laying the crop in a substantially quiescent state upon the bent stubble.

6. The method of harvesting crops consisting in cutting the crop along a line to leave stubble, applying a bending force to the upper ends only of the stubble across a path of a width predetermined to the width of the windrow to be laid to form an elevated springy stubble mat capable of holding a windrow in aeratable position above the ground, carrying the cut crop parallel to the line of cut to a delivery zone, arresting the movement and checking the momentum of the material at the end of said carrying movement, and then moving the material transversely of said carrying movement and laying it in a substantially quiescent state on top of said bent stubble in windrow formation.

7. The method of harvesting a standing crop which consists in cutting the crop to leave stubble, then carrying the crop material parallel to the line of cut to a delivery zone of a width corresponding to the width of a windrow to be formed, depositing the material at the end of said carrying movement upon a support mounted immediately above the stubble to relieve the momentum of said material, applying the contacting force of the support to the stubble a short distance only below the stubble tops to bend the stubble, and then continuously moving the material from said support transversely of said carrying movement and laying it in a substantially quiescent state on top of said stubble.

WILLIAM M. TEMPLETON.